United States Patent [19]

Sinclair

[11] Patent Number: 4,810,146
[45] Date of Patent: Mar. 7, 1989

[54] TOGGLE BOLT UNIT WITH LOCKING MECHANISM

[75] Inventor: Mark A. Sinclair, Southwick, Mass.

[73] Assignee: CWR Manufacturing, Syracuse, N.Y.

[21] Appl. No.: 47,107

[22] Filed: May 8, 1987

[51] Int. Cl.$^4$ ............................................. F16B 21/00
[52] U.S. Cl. ..................................... 411/342; 411/346
[58] Field of Search ............................. 411/340–346, 411/970

[56] References Cited

U.S. PATENT DOCUMENTS

| | | |
|---|---|---|
| 1,228,512 | 8/1917 | Ziferer . |
| 1,373,188 | 3/1921 | Goewey . |
| 1,600,034 | 8/1926 | Brenizer . |
| 2,024,871 | 12/1935 | Parsons . |
| 2,061,634 | 11/1936 | Pleister . |
| 2,616,327 | 11/1952 | Karitzky . |
| 3,288,014 | 12/1966 | Mortensen . |
| 3,302,508 | 2/1967 | Topf . |
| 3,389,631 | 6/1968 | Vaillancourt ....................... 411/346 |
| 3,513,746 | 1/1971 | Forsberg ............................. 411/346 |
| 3,605,547 | 9/1971 | Millet ................................. 411/344 |
| 4,079,655 | 3/1978 | Roberson, Jr. . |
| 4,286,497 | 9/1981 | Shamah ............................. 411/342 |
| 4,616,968 | 9/1986 | Giannuzzi ......................... 411/342 |
| 4,668,144 | 5/1987 | Giannuzzi ......................... 411/342 |
| 4,732,520 | 3/1988 | Giannuzzi ..................... 411/346 X |

Primary Examiner—Neill R. Wilson
Attorney, Agent, or Firm—Wall and Roehrig

[57] ABSTRACT

A toggle bolt assembly that includes a flexible elongated strip that is hung upon the bolt so that the strip loops over the winged trunnion nut. One end of the strip is hung between the nut and the wings while the opposite end of the strip is hung between the bolt head and the nut. The opposite end of the strip is expanded so that it can be wedged tightly into the clearance hole formed in a hollow through which the wings are passed in assembly. The wedged strip holds the unfolded wings in a non-rotating condition inside the wall.

10 Claims, 1 Drawing Sheet

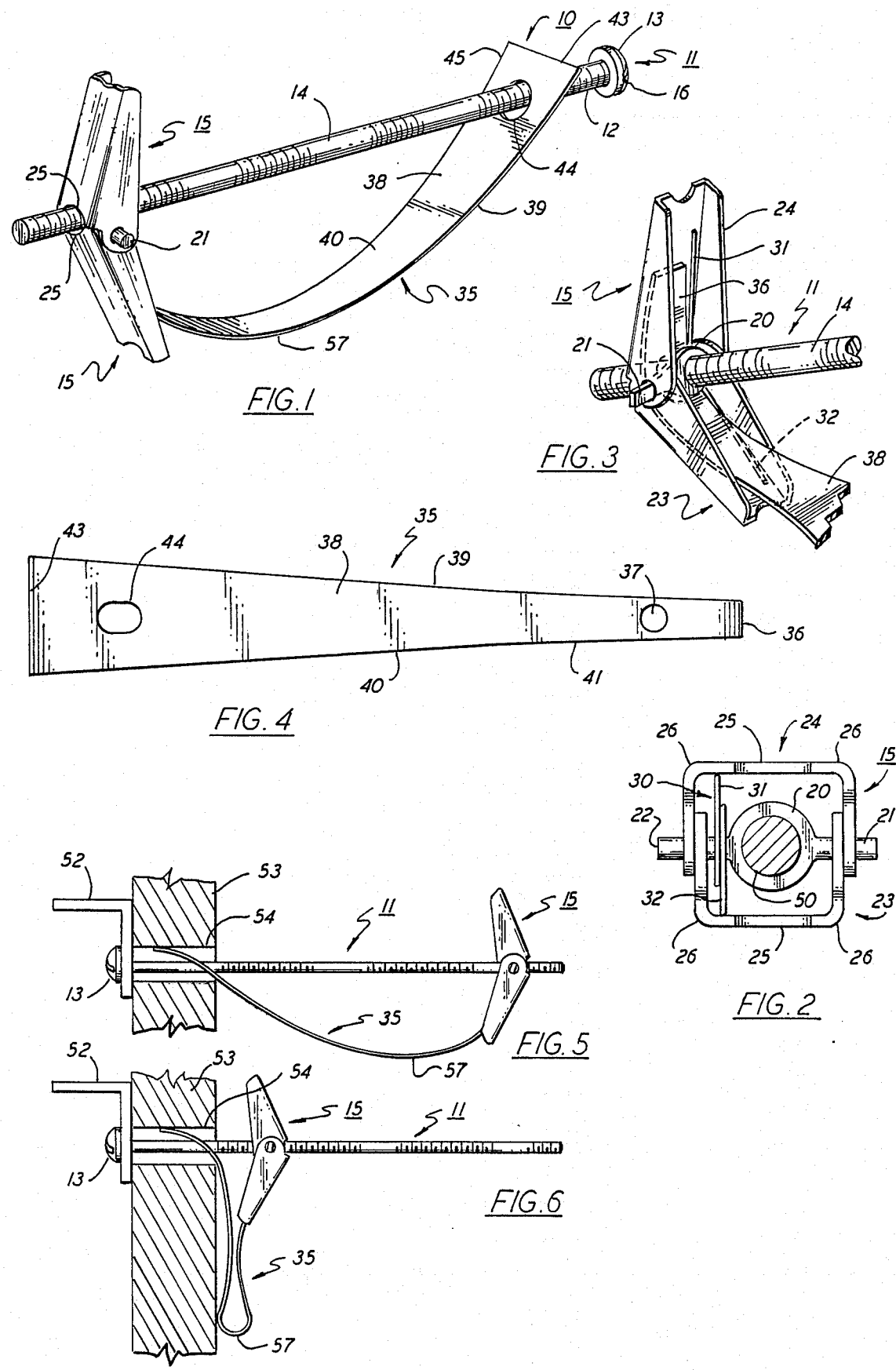

TOGGLE BOLT UNIT WITH LOCKING MECHANISM

BACKGROUND OF THE INVENTION

This invention relates to an improved toggle bolt assembly that is insertable through a clearance hole formed in a hollow wall and, in particular, to a thin flexible locking strip that is looped over the bolt to lock the wings of the trunnion nut in a non-rotatable unfolded condition inside the hollow wall. As disclosed by Giannuzzi in U.S. Pat. No. 4,616,968, one problem associated with most toggle bolt assemblies relates to the fact that the winged trunnion nut is free to rotate with the bolt after it has passed into the wall. In order to prevent rotation, the bolt and the fixture attached thereto are generally pulled away from the wall to anchor the extended or unfolded wings against the back of the wall. While applying back pressure to the bolt, the operator must turn the bolt forward into the now retained trunnion nut while at the same time supporting the weight of the fixture. This can oftentimes prove to be a difficult and dangerous operation particularly where the worker is using a power tool to drive the bolt home. It is further noted that toggle bolts also tend to become loosened where subject to vibrations thereby releasing the attached fixture from the wall.

Giannuzzi solves the problems noted in the prior art by incorporating a wire locking device in a toggle bolt assembly. The wire device is wound about one of the nut trunnions. One end of the coil has a short tail that extends under a wing of the nut unit. The other end of the coil has a longer tail that terminates in a compressible loop. The loop, in assembly, is compressed inside the clearance hole alongside the bolt and serves to hold the winged trunnion nut against rotation. Accordingly, the head of the bolt and the fixture captured thereunder can be conveniently supported against the outside of the wall while the bolt is being driven home. Once tightened down, the bolt is prevented from loosening by the holding power of the wire locking coil.

The Giannuzzi device functions quite well to lock the winged trunnion nut of a toggle assembly against rotation. However, the device has certain disadvantages that make it difficult to use in the field. The wire locking coil must be wrapped about one of the trunnions during manufacture of the winged nut unit thus raising considerably the unit price of the assembly. The locking device must act in concert with the toggle spring to insure proper extension of the wings. The locking coil also is formed of metal, which in many applications is exposed to moisture. The exposed coils under these conditions will corrode and eventually fail whereupon the bolt can work loose of the nut. The compressible loop of the locking device must be located inside the bolt clearance hole alongside the bolt shank. As a consequence, the coil can be either broken or driven out of the hole by the turning screw threads. The locking device of the Giannuzzi assembly as noted is made of thin wire with the compressible loop cantilevered from the main coil by a long thin wire tail which is easily bent or otherwise damaged during handling or shipping. Here again, any damage to the delicate tail will typically render the device unusable.

SUMMARY OF THE INVENTION

It is therefore an object of the present invention to improve locking devices for use in toggle bolt assemblies. It is a further object of the present invention to provide a toggle bolt assembly with a simple locking device that can be joined to an existing bolt assembly in the field.

A still further object of the present invention is to provide a simple flexible locking strip that can be looped over the bolt of a toggle bolt assembly to hold the winged trunnion nut unit in a non-rotatable condition inside a hollow wall whereby the head of the bolt and a fixture captured thereunder can be seated tightly against a receiving wall as the bolt is being tightened down.

Another object of the present invention is to provide a simple locking device for a toggle bolt assembly that will not corrode when exposed to moisture or the like.

Yet another object of the present invention is to provide a simple flexible locking strip for a toggle bolt assembly which is practically damage proof.

These and other objects of the present invention are attained by a toggle bolt assembly that includes a headed bolt threaded onto a winged trunnion nut unit that is passed through a clearance hole in a hollow wall for the purpose of attaching a fixture to the wall. A thin flexible strip having a first hole at its front end and a second hole at its tail end is hung on the bolt so that the strip loops over the trunnion nut. The front end section of the strip is shaped so that it can be passed between the nut and the wings inside the wing channels. The tail end section of the strip is wedge shaped. The wedge increases in width as it moves away from the head end section so that the width at the end of the wedge is greater than the diameter of the clearance hole. When the bolt is fully inserted into the clearance hole the strip is tightly wedged into the hole thereby holding the winged trunnion nut in a fully unfolded non-rotatable condition inside the wall.

BRIEF DESCRIPTION OF THE DRAWINGS

For a better understanding of these and further objects of the present invention reference is made to the following detailed description of the invention which is to be read in conjunction with the associated drawings, wherein:

FIG. 1 is a perspective view of a toggle bolt assembly employing the locking strip of the present invention;

FIG. 2 is an enlarged end view of the trunnion nut unit used in the assembly of FIG. 1 showing the wings folded back against the shank of the bolt;

FIG. 3 is an enlarged perspective view illustrating the trunnion nut unit of the assembly in an unfolded condition;

FIG. 4 is a top plan view of the locking strip used in the assembly of FIG. 1;

FIG. 5 is a side view showing the present toggle bolt assembly fully inserted into a clearance hole formed in a hollow wall with a fixture captured under the bolt head; and FIG. 6 is also a side view of the toggle bolt assembly shown in FIG. 5 showing the winged trunnion nut threaded inwardly toward the wall.

DETAILED DESCRIPTION OF THE INVENTION

Referring initially to FIGS. 1-4 there is shown a typical toggle bolt assembly 10 for securing fixtures to a hollow wall. The term wall, as herein used, is broad enough to include a roof and the fixture might be a roof plate. The assembly includes an elongated threaded bolt 11 having a shank 12 and an expanded head 13. Threads 14 are formed along the shank to enable a trunnion nut unit, generally referenced 15, to be threaded thereon. The head of the bolt contains a slot 16 that is engageable by a manual or power driven screw driver for turning the bolt. A square or hexagon shaped head may be used for the same purpose.

The trunnion nut unit 15 contains a circular nut 20 having diametrical opposed trunnions 21 and 22 radially extending from its body. A pair of foldable wings 23 and 24 are rotatably supported upon the trunnions. The wings are channel shaped members that are arranged so that one wing rides inside the other in assembly. The adjacent edges of the wings have arcuate shaped cutouts 25—25 that permit the shank of the bolt to pass through the wings. As shown in FIG. 2, a pair of shoulders 26—26 are formed on either side of the cutouts. The stops come into abutting contact when the wings are fully unfolded as shown in FIG. 1.

Typically, a wire spring 30 is wound about one of the trunnions and is contained inside the wings. The spring includes a first extended leg 31 that passes under wing 24 and a second extended leg 32 that passes under wing 23. The spring is mounted upon the trunnion in a loaded condition so that the legs are biased in contact against the wings to urge the wings outwardly into the fully unfolded condition shown in FIG. 1. By overcoming the biasing pressure of the spring, the wings can be folded inwardly over the nut as shown in FIG. 2 to permit the wing to pass through a clearance hole drilled in any type of hollow wall. After passing through the hole, the wings are unfolded by the spring to prevent the trunnion nut unit from being withdrawn through the hole.

As noted above, ordinarily the trunnion nut of the toggle bolt assembly cannot be turned unless the unfolded wings are pulled back tightly against the inside surface of the wall. Sufficient back pressure must be exerted on the bolt to prevent the wings from turning as the bolt is being threaded onto the nut. As a result, the bolt is being pulled back while it is trying to advance forward on the nut. This makes for a rather awkward and sometimes dangerous situation particularly when a power tool is being used or the fixture is being attached to a pitched roof or high up on a vertical wall.

Included in he present assembly is a thin flexible locking strip 35. As illustrated in FIG. 4, the strip includes a narrow rectangular shaped front section 36 that depends from a tapered tail section 38. The front section is narrow enough to be received inside both of the two channel shaped wings. The front section contains a hole 37 which is large enough to allow the bolt to pass therethrough. The tail section 38 of the strip projects back from the front section. The tail section is wedge shaped with the sides 39 and 40 expanding outwardly from its base 41 toward its terminal end 43. A slotted hole 44 is formed in the tail section near the end wall which again allows the bolt 11 to pass freely therethrough. Holes 37 and 44 are both centered upon the central axis of the strip. The width of the terminal end 45 of the tail section is greater than the diameter of the clearance hole needed to pass the folded wings of the trunnion nut unit. The purpose for this will become evident from the disclosure below.

As best seen in FIGS. 1 and 3, in assembly, the locking strip 35 is mounted on the bolt by first passing the bolt shank through the slotted hole 44 located near the terminal end 45 of the strip. Next, the front section 36 of the strip is passed between the trunnion nut and wings and hole 37 is aligned with the threaded hole 50 (FIG. 2) formed in the nut. The bolt is threaded onto the nut whereupon it passes through hole 37 and out of the wings through cutouts 25—25. The strip is of sufficient length so that it hangs down in a loop 57 that passes over the nut. Preferably the strip should be about as long as the bolt.

The stop strip can be formed of any thin flexible material such as stiff paperboard or plastic that can be inexpensively die cut or otherwise formed to the desired shape.

With further reference to FIGS. 5 and 6, the present toggle bolt assembly will be described with reference to mounting an L-shaped bracket 52 upon a hollow wall 53 in which a suitable clearance hole 54 has been drilled. Initially the wings are folded over the nut and the nut unit and the unit is pushed through the hole whereupon the wings extend to the unfolded condition inside the wall. The bolt is now fully inserted in the hole as shown in FIG. 5 to seat the fixture tightly against the wall. This, in turn, forces the expanded terminal end 43 of the stop strip into the clearance hole. As noted above, the expanded end of the strip is wider than the hole diameter and, as a result, the strip is wedged tightly into the hole.

The overall length of the stop strip being greater than the axial mounting distance between the trunnion nut and the inside of the wall automatically forms a loop 57 (FIG. 5) between the wall and wings. The loop functions to push the wings into a fully extended or unfolded condition inside the wall. Although the present assembly is shown equipped with a biasing spring for unfolding the wings, the spring may be removed from assemblies utilizing the present locking strip without impeding the ability of the wings to unfold inside the wall. In addition to unfolding the wings, the strip, when wedged in the clearance hole, securely holds the wings and thus the entire nut unit in a non-rotatable condition in reference to the bolt. Accordingly, the fully inserted bolt can now be turned to tighten the nut unit against the inside of the wall and thus secure the fixture to the wall.

Advancing the bolt now draws the nut inwardly toward the wall as shown in FIG. 6. The loop 57 in the strip becomes more pronounced thus increasing the holding force of the strip on the nut unit and more securely wedges the strip into the clearance hole. Finally, when the wings are tightly drawn against the back of the wall by the bolt, a constant holding force is exerted on the assembly that prevents the nut from loosening even when the assembly is subjected to high vibratory forces over long periods of time.

While this invention has been described in detail with reference to particular embodiments, it should be understood that many modifications and variations would be apparent to those of skill in the art without departure from the scope and spirit of the invention, as defined in the appended claims.

What is claimed is:

1. Apparatus for locking a toggle bolt assembly to a hollow wall having a clearance hole formed therein that includes a headed bolt having a nut unit threaded thereon, said nut unit including opposed trunnions radially extended from the nut, and a pair of channel shaped wings pivotally mounted on the trunnions behind the nut away from the bolt head so that the open side of the channels face the bolt head, said wings being arranged to move between a folded position whereby the wings can pass through the clearance hole and an unfolded position whereby the wing cannot be withdrawn through said clearance hole, an elongated flat flexible strip having a first hole near its front section and a second hole near its tail section, the bolt passing through said first and second holes whereby the strip hangs from the bolt in a loop with the front section of the strip being hung on the bolt between the wings and the nut and the tail section of the strip being hung on the bolt between the head of the bolt and nut, the tail section of the strip being expanded so that the width at the back end of the strip is greater than the diameter of the clearance hole whereby the back end of the strip is wedged into the clearance hole when the bolt is fully inserted into the clearance hole thereby holding the wing in an unfolded non-rotatable condition inside the wall.

2. The apparatus of claim 1 wherein the front section of the strip is rectangular shaped and the tail section is wedge shaped with the sides of the tail section expanding outwardly toward the back end of the strip.

3. The apparatus of claim 2 wherein the flexible strip is formed of a thin sheet of plastic.

4. The apparatus of claim 1 wherein the first and second holes are aligned along the central axis of the strip and the second hole is elongated along said axis.

5. The apparatus of claim 2 wherein the width of the rectangular shaped section is less than the inside width of the wing channels so that the head end of the strip can slip easily between the nut and the wings.

6. The apparatus of claim 1 further including a biasing spring acting against the wing to urge the wings into an unfolded position.

7. The apparatus of claim 1 that further includes a fixture mounted on the bolt between the bolt head and the locking strip.

8. In a toggle bolt assembly that includes a headed bolt threaded into a nut unit having opposed trunnions upon which are pivotally mounted a pair of channel shaped wings adapted to unfold against each other behind the nut and to fold over the nut so that the wings can be inserted through a clearance hole formed in a hollow wall, apparatus for locking the wings in an unfolded non-rotatable condition inside the wall that includes a flexible elongated flat strip having a rectangular front section and an expanded wedge shaped tail section, a first hole formed in the front section and a second hole formed in the tail section whereby the bolt may be passed through the first and second holes to hang the front section between the nut and the wings and the rear section between the nut and the head of the bolt whereby the strip loops over the nut, the expanded back end of the strip being greater in width than the diameter of the clearance hole whereby the back end of the strip is wedged into the clearance hole when the bolt is fully inserted into the wall whereby the strip forces the wings into an unfolded position inside the wall and engages the wing channels to hold the nut unit in a non-rotating condition to permit the bolt to be threaded thereon.

9. The apparatus of claim 8 wherein the strip is made of a thin sheet of deformable plastic.

10. The apparatus of claim 9 wherein the first and second holes are centered upon the central axis of the sheet and said second hole is elongated along the axis.

* * * * *